(12) United States Patent
Haendel et al.

(10) Patent No.: US 6,501,424 B1
(45) Date of Patent: Dec. 31, 2002

(54) USE OF GPS CORRECTION DATA ON TRANS-OCEANIC ROUTES

(75) Inventors: Richard S. Haendel, Iowa City, IA (US); Ronald R. Meyer, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/493,900

(22) Filed: Jan. 28, 2000

(51) Int. Cl.[7] .................................................. G01S 3/02
(52) U.S. Cl. .................. 342/455; 342/456; 342/357.08; 342/357.09; 701/301
(58) Field of Search ......................... 342/357.09, 357.1, 342/357.03, 357.08, 455, 456; 701/215, 301

(56) References Cited

U.S. PATENT DOCUMENTS 5,345,245 A * 9/1994 Ishikawa et al. ............. 342/457
6,236,359 B1 * 5/2001 Watters et al. ........... 342/357.1

* cited by examiner

*Primary Examiner*—Theodore M. Blum
(74) *Attorney, Agent, or Firm*—Nathan O. Jensen; Kyle Eppele

(57) ABSTRACT

An air traffic control system in which an airborne GPS receiver on a trans-oceanic flight is provided pseudo range correction data and satellite integrity information from a group of terrestrial HF transmitters, transmitting on a common set of frequencies and using a time division multiplexing scheme.

20 Claims, 1 Drawing Sheet

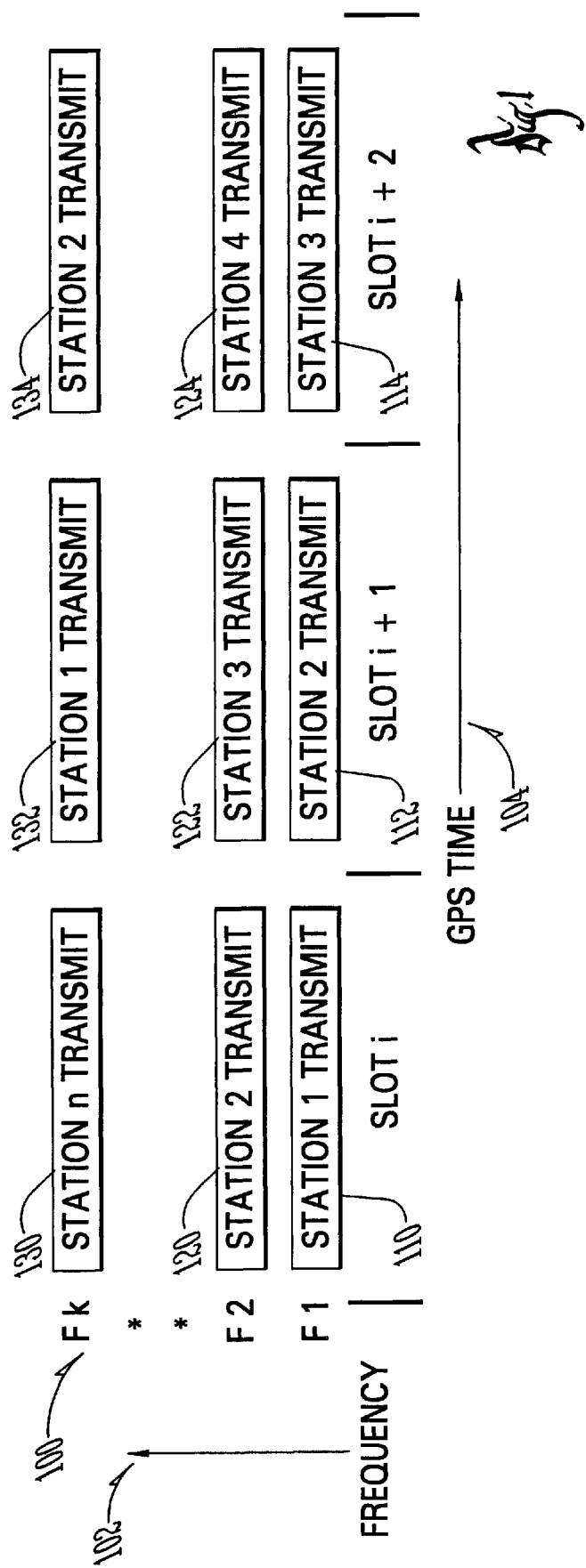

USE OF GPS CORRECTION DATA ON TRANS-OCEANIC ROUTES

FIELD OF THE INVENTION

The present invention generally relates to global navigation satellite systems (GNSS), and more particularly relates to differential GPS (DGPS) and corrected position solutions, and even more particularly relates to a system and method for communicating differential GNSS pseudo range correction data together with satellite health information to remote aircraft, located beyond the range of VHF data link communications.

BACKGROUND OF THE INVENTION

In the past, designers of avionics navigation systems have endeavored to provide systems with improved abilities to more precisely make location determinations using GPS satellites. One widely accepted approach to enhancing positional resolution for GPS receivers has been the use of differential. GPS, which involves using a GPS receiver located at a known fixed location to generate pseudo range correction data, which then is provided to mobile receivers via a data link connection, where it is used to enhance the position determination abilities of the mobile receiver. This method is used widely in commercial airports throughout the world. Another method of improving GPS position determinations is for the airborne receiver to receive and use information relative to the health or status of improperly operating GPS satellites.

Trans-oceanic flights are presently spaced about 120 nautical miles apart in line, and fly in a grid system with lanes approximately 60 nautical miles apart to assure positive aircraft separation. Congestion and/or delays are possible owing to the limited number of available routes and the separation between aircraft for safety. Unfavorable winds and turbulence often limit these available routes even further, thereby increasing the potential for congestion and delays. Normal inertial reference systems are typically subject to drift over time and, therefore, would be incapable of providing a high integrity source of position reference throughout an extended flight. Differential GNSS, as well as satellite health and satellite integrity information, could be extremely useful in safely packing more aircraft in these trans-oceanic routes. Trans-oceanic aircraft typically report their locations derived from inertial navigation systems during trans-oceanic flights. Differential GNSS and satellite integrity data are not generally available on trans-oceanic flights, because the data link radios most typically used for such information are VHF radios, with a range of approximately 200 N miles.

Consequently, there exists a need for improvement in systems and methods for controlling trans-oceanic air traffic and for reporting pseudo range correction and providing satellite integrity data to aircraft on trans-oceanic routes.

SUMMARY OF THE INVENTION

It is an object of the present invention to efficiently and safely control air traffic for trans-oceanic flights.

It is another object of the present invention to decrease the minimum separation distance between aircraft on trans-oceanic flights.

It is a feature of the present invention to utilize an HF broadcast network of coastal and island-based differential GPS ground stations.

It is an advantage of the present invention to better deliver to trans-oceanic flights both pseudo range correction data being generated by various DGPS stations, as well as satellite integrity information.

The present invention is an apparatus and method for monitoring and reporting pseudo range correction data and satellite integrity information for GPS receivers used on trans-oceanic flights, which is designed to satisfy the aforementioned needs, provide the previously stated objects, include the above-listed features and achieve the already articulated advantages. The present invention is carried out in a "VHF data link-less system" in a sense that the range limitations generally associated with VHF communication have been greatly reduced.

Accordingly, the present invention is a system and method for monitoring and reporting satellite integrity and pseudo range correction data to trans-oceanic GNSS receivers, where the system and method involves using a network of numerous coastal and island-based HF transmitters operating on a set of common frequencies and which use multiplexing.

BRIEF DESCRIPTION OF THE DRAWINGS

The invention may be more fully understood by reading the following description of the preferred embodiments of the invention, in conjunction with the appended drawing wherein:

The FIGURE is a simplified diagram of an HF broadcast scheme of the present invention, which shows a plurality of transmission slots for several station and frequencies.

DETAILED DESCRIPTION

Now referring to the drawing wherein like numerals refer to like matter throughout, there is shown a Multiplexing scheme of the present invention, generally designated 100, showing a two-dimensional array of transmission time slots, having a vertical axis 102, which shows several (k) distinct transmission frequencies to be used. The precise frequencies used will preferably be selected and permitted based upon their known transmission characteristics. The number of frequencies used (k) will be a matter of designer's choice, however. It is preferred that several frequencies be used, owing to the well-known diurnal differences in HF transmission characteristics as a function of local time of day (position of the sun) and other factors. Higher frequencies are known to propagate better when the path is illuminated with sunlight, while paths in darkness required lower frequencies for optimal propagation. It is believed that a preferred embodiment of the present invention would use at least six distinct HF frequencies. Also shown is a horizontal axis 104, which is a function of time. A period of repetition is established. The duration of this period is a function of several variables, including the length and content of the information to be transmitted during each time slot, the number of transmitting stations, and the requirements for maximum time for an aircraft to be flying without receiving an update. The content of the information is preferred to include a station identification, satellite pseudo range correction data and satellite or transmitter health information. Throughout this document, GPS and DGPS are used as examples of a broader set of position determination schemes which could include, but are not limited to: Glonass, Loran, or any other system which uses or could use a "differential like" method for improving position determination.

Slot 110 indicates a time slot for Station 1 to transmit on Frequency 1. At a predetermined time interval later, preferably based upon GPS time, a second station, Station 2, will transmit on the same frequency, Frequency 1. Station 3 then transmits during the next available time slot, and the process continues until each station has transmitted its message. The cycle is then repeated continuously. However, there may be some adjustments in the slot usage, depending upon the time of day. For example, Station 1 may have a local time of 1:00 am and may transmit very well on Frequency 1 (we will assume Frequency 1 is a relatively low frequency). However, Station 3 may have a local time of 1:00 pm and may have very limited effectiveness with Frequency 1. Consequently, depending upon the time of day, in this example, Station 3 may be omitted from the list of transmitting stations on that frequency, but not on another frequency or frequencies. This leaves a free time slot and Frequency 1 available for use by other stations. The omission of Station 3 on a particular frequency and time slot would not necessarily be required, but it may be permitted. It may be preferred to keep the transmission schedule constant and change the way the receiver scans the available frequencies as a function of time of day. Also, the GPS ionospheric delay broadcast parameters could be used as an indirect indicator of solar flux activity and be used by the airborne receiver to select an optimal set of frequencies to scan. The transmission scheme preferably would be structured so that an aircraft would at any given time be within range of at least two or three stations on at least two or three frequencies. If a failure occurs at one station on a particular frequency, the aircraft could still receive the necessary information from another station or on another frequency from the same station. Slot 120 represents a time period during which Station 2 would transmit on Frequency 2. Slot 122 is the interval for Station 3 to transmit on Frequency 2, and Slot 124 represents the time slot for Station 4 to transmit on Frequency 2. Slot 130 represents a time for Station N (the highest numbered station) to transmit on Frequency K (the highest numbered frequency). Slot 132 then shows that Station 1 would transmit on Frequency K. Finally, Slot 134 shows that Station 2 would transmit on Frequency K. It may be helpful to focus on Station 2 to illustrate how one station would operate over time. Slot 120 shows that Station 2 would first transmit on Frequency 2; it then would stop transmitting, switch to Frequency 1 and transmit during Slot 112. It then would stop transmitting and begin transmitting on Frequency K. The order of transmission is shown for example. The actual order could be any order chosen to accomplish the desired goal of transmitting the desired information to aircraft wherever they may be located during a trans-oceanic flight. Ultimately, the frequencies and timing scheme will need to be a set international standard.

It is possible that a station may transmit on more than one frequency at any one period of time during the day as long as the combination of frequency and time slot does not interfere with other stations. This would be accomplished by network management and a frequency planning process.

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

We claim:

1. A system comprising:
   an airborne positioning receiver, for receiving positioning signals from a plurality of positioning transmitters and generating a position determination in response thereto;
   an airborne HF data receiver, coupled to said airborne positioning receiver; said HF data receiver providing a series of signals responsive to a plurality of broadcast messages which relate to said plurality of positioning transmitters, said plurality of broadcast messages being transmitted from a plurality of terrestrial HF transmitters, in accordance with a predetermined multiplexing scheme; and,
   a processor which uses information relating to said predetermined multiplexing scheme;
   wherein the predetermined multiplexing scheme includes a reception of the plurality of broadcast messages from the plurality of terrestrial HF transmitters in a predetermined reception sequence on each of a plurality of frequencies, and further wherein the predetermined reception sequence of terrestrial HF transmitters on one of the plurality of frequencies, over a predetermined time, is different from the predetermined reception sequence of terrestrial HF transmitters on others of the plurality of frequencies over the predetermined time.

2. A system of claim 1 wherein said processor is coupled to said airborne positioning receiver.

3. A system of claim 2 wherein said processor is integral with said airborne positioning receiver.

4. A system of claim 1 wherein said airborne positioning receiver is a Global navigation positioning receiver.

5. A system of claim 4 wherein said plurality of broadcast messages contains pseudo range correction data.

6. A system of claim 4 wherein said plurality of broadcast messages contains satellite integrity information.

7. A system of claim 6 wherein said plurality of broadcast messages contains a station identification.

8. A system of claim 1 wherein said airborne HF data receiver is a multi-channel receiver.

9. A system of claim 1 wherein the frequencies scanned and received by said airborne HF data receiver are determined as a function of local time of day.

10. A system of claim 1 wherein said airborne HF data receiver scans a variable list of predetermined frequencies wherein said variable list is determined as a function of an ionospheric delay broadcast parameter relating to said positioning signals.

11. The system of claim 1, wherein the number of the plurality of frequencies is different from the number of terrestrial HF transmitters.

12. The system of claim 1 wherein the terrestrial HF transmitters received over at least one of the plurality of frequencies are determined as a function of local time of day.

13. A method of determining a position of an aircraft at an intermediate position during a trans-oceanic flight, the method comprising the steps of:
    receiving a plurality of positioning signals from a plurality of positioning transmitters;
    receiving on an airborne data receiver, on a set of common frequencies directly from a plurality of terrestrial HF transmitters, in accordance with a multiplexing scheme, additional information relating to said plurality of transmitters; and
    determining a position characteristic of said aircraft in response to said additional information.

14. A method of claim 13 wherein said plurality of terrestrial HF transmitters broadcasts on a plurality of common frequencies.

15. A method of claim 14 wherein said step of receiving is responsive to a local time of day characteristic of said aircraft.

16. A method of claim 14 wherein said step of receiving is responsive to an ionospheric delay characteristic of said positioning signals.

17. The method of claim 13, wherein the number of common frequencies is different from the number of terrestrial HF transmitters.

18. The method of claim 13, wherein the multiplexing scheme includes:

defining a plurality of time slots configured such that said additional information transmitted from any one of the plurality of terrestrial HF transmitters may be received during any of the plurality of time slots; and assigning a predetermined reception sequence corresponding to each of said common frequencies by determining, for each of said common frequencies, the time slot that additional information from each of the plurality of terrestrial HF transmitters is to be received;

wherein a predetermined reception sequence corresponding to one of said common frequencies is different, over a predetermined time, from the predetermined reception sequences corresponding to others of said common frequencies.

19. A method of controlling aircraft spacing on transoceanic routes comprising the steps of:

providing information relating to a GPS satellite to a data receiver on an aircraft, said aircraft located beyond a range of communication of any terrestrial VHF data link, said information provided directly via terrestrial transmissions; and, using said information to determine a minimum separation distance of aircraft.

20. A method of claim 19 wherein said terrestrial transmissions are on a common frequency and in accordance with a time division multiplexing scheme.

* * * * *